United States Patent
Gladisch et al.

(10) Patent No.: US 12,051,234 B2
(45) Date of Patent: Jul. 30, 2024

(54) MODIFYING PARAMETER SETS CHARACTERISING A COMPUTER VISION MODEL

(71) Applicant: Robert Bosch GmbH, Stuttgart (DE)

(72) Inventors: Christoph Gladisch, Renningen (DE); Christian Heinzemann, Ludwigsburg (DE); Martin Herrmann, Korntal (DE); Matthias Woehrle, Bietigheim-Bissingen (DE); Nadja Schalm, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 412 days.

(21) Appl. No.: 17/646,914

(22) Filed: Jan. 4, 2022

(65) Prior Publication Data

US 2022/0222926 A1  Jul. 14, 2022

(30) Foreign Application Priority Data

Jan. 14, 2021 (DE) .................... 10 2021 200 300.1

(51) Int. Cl.
| | |
|---|---|
| *G06V 10/776* | (2022.01) |
| *G06V 10/764* | (2022.01) |
| *G06V 10/766* | (2022.01) |
| *G06V 10/774* | (2022.01) |

(52) U.S. Cl.
CPC .......... *G06V 10/776* (2022.01); *G06V 10/764* (2022.01); *G06V 10/766* (2022.01); *G06V 10/774* (2022.01)

(58) Field of Classification Search
CPC .. G06V 10/776; G06V 10/764; G06V 10/766; G06V 10/774; G06V 20/56; G06V 10/82; G06N 20/00; G06F 18/214
USPC ......................................................... 382/159
See application file for complete search history.

(56) References Cited

U.S. PATENT DOCUMENTS

| | | | | |
|---|---|---|---|---|
| 2017/0293356 | A1* | 10/2017 | Khaderi | G02B 27/0172 |
| 2020/0050965 | A1* | 2/2020 | Harvill | G06N 5/04 |
| 2020/0193552 | A1* | 6/2020 | Turkelson | G06N 20/20 |
| 2022/0076064 | A1* | 3/2022 | St. Romain, II | G06F 18/214 |

OTHER PUBLICATIONS

Dosovitskiy, Alexey et al. "CARLA: An Open Urban Driving Simulator" 1st Conference on Robot Learning (CoRL 2017) Mountain View, United States. Nov. 10, 2017. arXiv:1711.03938v1. Retreived from the Internet on Dec. 29, 2021: https://arxiv.org/pdf/1711.03938.pdf. 16 Pages.

Bargoti and Underwood: "Utiising Metadata to Aid Image Classification in Orchards", IEEE International Conference on Intelligent Robots and Systems (IROS), Workshop on Alternative Sensing for Robot Perception (WASRoP), (2015), pp. 1-3.

(Continued)

*Primary Examiner* — Juan A Torres
(74) *Attorney, Agent, or Firm* — NORTON ROSE FULBRIGHT US LLP; Gerard A. Messina

(57) ABSTRACT

Modifying a visual parameter specification characterising the operational design domain of the computer vision model by improving the visual parameter specification according to a sensitivity analysis of the computer vision model.

17 Claims, 7 Drawing Sheets

(56) References Cited

OTHER PUBLICATIONS

Engelbrecht, et al.: "Determining the Significance of Input Parameters Using Sensitivity Analysis", International Workshop on Artificial Neural Networks, Springer, Berlin, Heidelberg, (1995), pp. 382-388.
Teodoro, et al.: "Algorithm sensitivity analysis and parameter tuning for tissue image segmentation pipelines", Bioimage informatics, Bioinformatics 33(7), (2017), pp. 1064-1072.

* cited by examiner

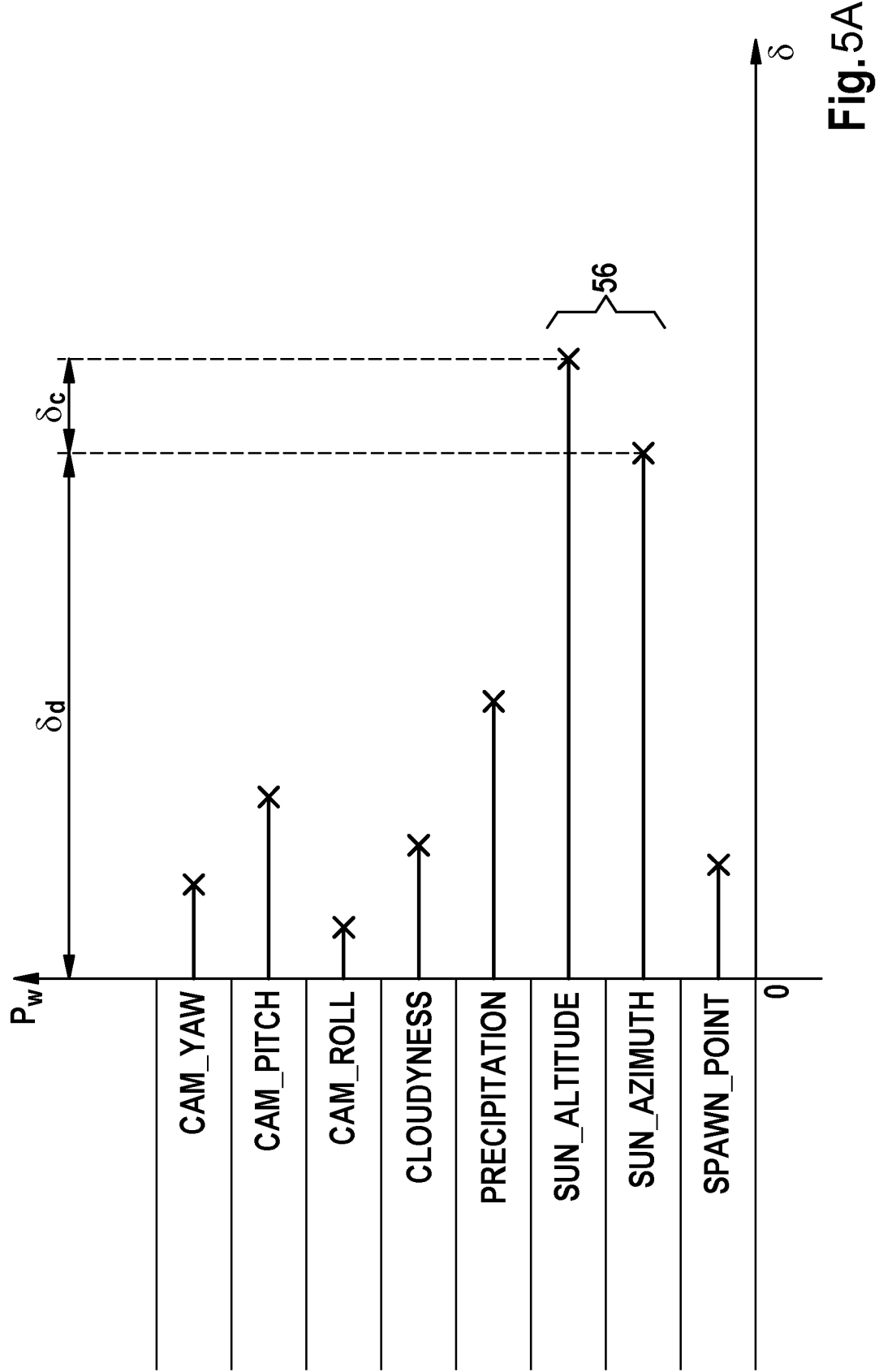

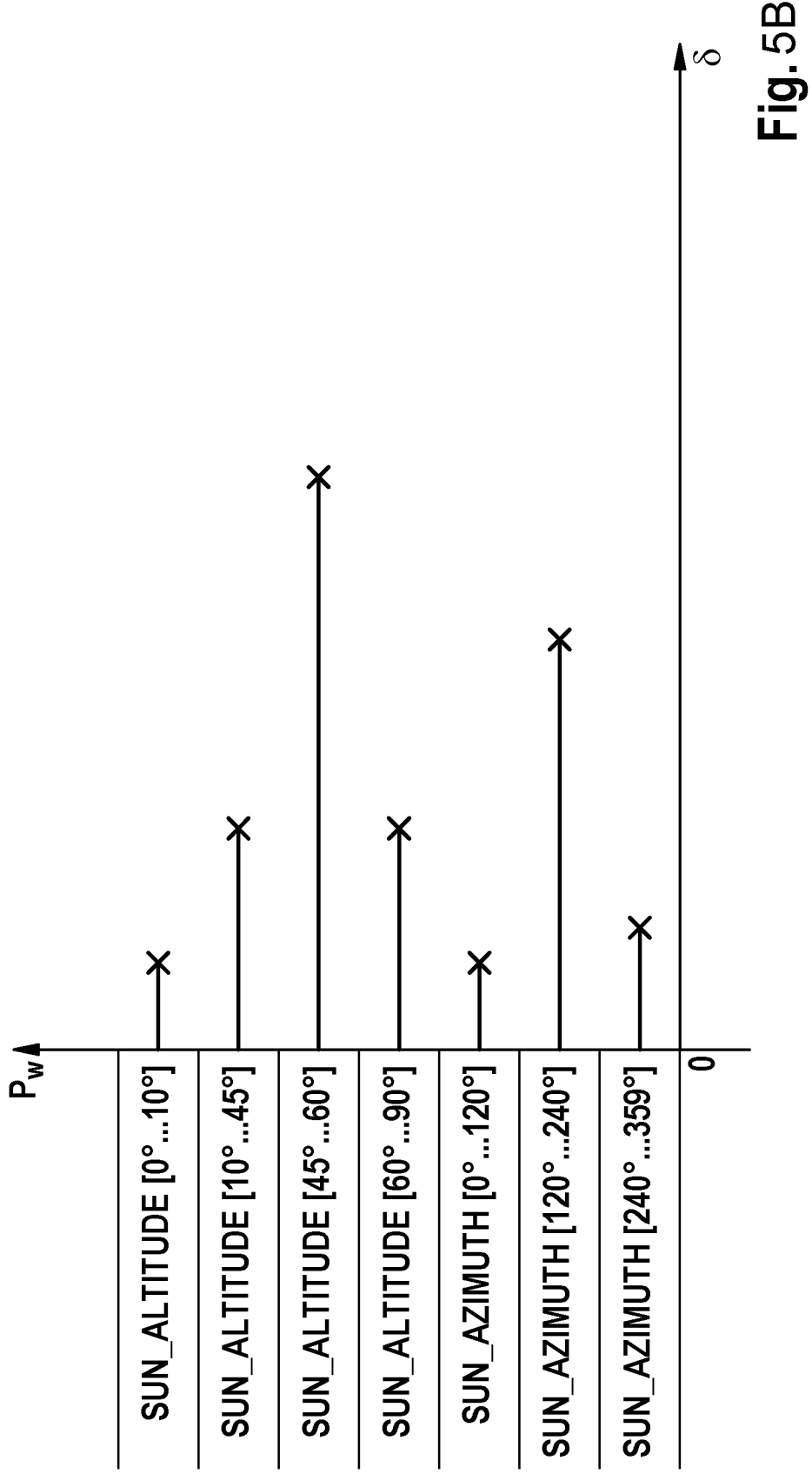

MODIFYING PARAMETER SETS CHARACTERISING A COMPUTER VISION MODEL

CROSS REFERENCE

The present application claims the benefit under 35 U.S.C. § 119 of German Patent Application DE 102021200300.1 filed on Jan. 14, 2021, which is expressly incorporated herein by reference in its entirety.

FIELD

The present invention relates a computer-implemented method for modifying a first visual parameter specification to provide a second visual parameter specification characterising a computer vision model. Associated aspects of the present invention concern a computer-implemented method for providing a set of training data, a computer-implemented method for training a computer vision model, an apparatus, a computer program, and a computer readable medium.

BACKGROUND INFORMATION

Computer vision concerns how computers can automatically gain high-level understanding from digital images or videos. Computer vision systems are finding increasing application to the automotive or robotic vehicle field. Computer vision can process inputs from any interaction between at least one detector and the environment of that detector. The environment may be perceived by the at least one detector as a scene or a succession of scenes. In particular, interaction may result from at least one camera, a multi-camera system, a RADAR system or a LIDAR system.

In automotive computer vision systems, computer vision often has to deal with open context, despite remaining safety-critical. It is, therefore, important that quantitative safeguarding means are taken into account both in designing and testing computer vision models. Present computer vision development approaches in autonomous driving are highly dependent on expert (human) input, which reduces the predictability of computer vision models. The development of computer vision may, thus, be further improved.

SUMMARY

According to a first aspect of the present invention, there is provided a computer-implemented method for modifying a first visual parameter specification to provide a second visual parameter specification characterising a computer vision model. In accordance with an example embodiment of the present invention, the method comprises:
  obtaining a computer vision model configured to perform a computer vision function of characterising elements of observed scenes;
  obtaining a first visual parameter specification comprising at least one initial visual parameter set, wherein an item of visual data provided based on the extent of the at least one visual parameter set is capable of affecting a classification or regression performance of the computer vision model;
  providing a visual data set comprising a subset of items of visual data compliant with the first visual parameter specification, and a corresponding subset of items of groundtruth data;
  applying the subset of items of visual data to the computer vision model to obtain a plurality of performance scores characterizing the performance of the computer vision model when applied to the subset of items of visual data of the visual data set, using the corresponding groundtruth data;
  performing a sensitivity analysis of the plurality of performance scores over a domain of the first visual parameter specification; and
  generating a second visual parameter specification comprising at least one updated visual parameter set, wherein the at least one initial visual parameter set is modified based on the outcome of the sensitivity analysis to provide the at least one updated visual parameter set.

The method according to the first aspect of the present invention may advantageously enable the automatic definition of a refined visual parameter specification that has been automatically improved to contain one or more visual parameter sets that are tuned to avoid weaknesses (parameter combinations causing high variance, for example) of a targeted computer vision model.

The visual parameter specification may be refined to comprise visual parameters that cause a large output variance of performance scores. For example, images chosen as training data according to the second visual parameter specification may be useful for training a computer vision model, because by avoiding samples having higher variance, the images chosen according to such a visual parameter specification will not lead to the training of the computer vision model using input data leading the computer vision model to underperform by providing incorrect predictions.

Reducing one or more redundant parameters in a visual parameter specification (or an operational design domain of the computer vision model) equates to a significant reduction in the size of a parameter space (and thus, computational complexity) when training or verifying a computer vision model, enabling a faster and more energy efficient training and/or verification process.

Visual parameters are any aspect of an image or video that affect the comprehension of a displayed scene by a machine vision function. As one example, a visual parameter might be the angle of the sun with respect to an ego-vehicle, a time of day, the height and proximity of buildings and trees in the scene, the speed of the ego-vehicle, the speed and location of vehicles relative to the ego-vehicle, the visual characteristics of a road surface in front of the ego vehicle, and the like.

In other words, a first step is to find visual parameters cause a high variance of performance but then, within these high variance parameters, the goal is to partition/cluster such parameters values (e.g. sun angle) into subranges with good performance and with low variance (since the goal is the to find the ODD) and to test this with a thorough verification step. Hence, in one example the final goal is an ODD with a low variance of performance scores.

As a concrete example, a wet road surface with the sun directly ahead of the ego-vehicle might result in additional glare being directed towards the windscreen of the ego vehicle. This condition could affect how accurately a computer vision model could classify road signs located forward of the ego vehicle, owing to increased glare. Accordingly, a road sign identification task of a computer vision model would, in the described condition, be more likely to misidentify road signs. Therefore, the performance of the computer vision model would show a higher result variance.

During the training of computer vision models, control over the training data set enables the computer vision model to be trained to address difficult conditions. An operational design domain (ODD) is defined that describes how the computer vision function should be used. Typically training of a computer vision model should include the ODD, but depending on the generalizability performance of the CV-function, the CV-function could perform well on an ODD even if it is not trained on it. Typically, the definition of the operational design domain is a highly manual task requiring the input of domain experts. According to an example embodiment of the present invention, domain experts may provide an initial operational design domain, or "first visual parameter specification" as referred to in this specification.

Once applied to a computer vision model providing input to the control system of an autonomous vehicle, robot, or drone, the computer vision model trained according to the present specification will perform more reliably, leading to an improvement in safety of the autonomous vehicle, robot, or drone.

The present invention further provides a system that automatically analyzes the performance of a computer vision model to training data using the initial operational design domain, and automatically provides a second operational design domain, or "second visual parameter specification" having improved visual parameters through iterative refinement. The second visual parameter specification is provided based on a sensitivity analysis of the performance of the computer vision model on a test training set chosen in accordance with an initial set of visual parameters.

In other words, if the initial set of visual parameters caused the computer vision model to underperform, such parameters may be de-emphasized, narrowed in scope, or removed in the second visual parameter specification. In particular, visual parameters may be prioritized, and a sub-range of the initial visual parameters defined as a safe operating region of the computer vision model. In some cases, a visual parameter can be split into several sub parameters.

A safe operating region is one in which the performance of the computer vision model when identifying elements in a scene of the training data is relatively insensitive to variations in the given visual parameter.

In general, the approach enables the automatic generation of an operational design domain using a repeatable automatic process that enables ambiguous interpretations of visual parameters to be resolved. Therefore, one or more visual parameter specifications generated according to the method of the first aspect can serve as an empirically validated test case for a computer vision model that implements a computer vision function. The methodology enforces decision making based on empirical results.

In other words, the first aspect analyses which visual parameters have the biggest impact when testing or statistically evaluating a computer vision model. Given a set of visual parameters and a computer vision model as input, a sorted list of visual parameters are output. By selecting a sub-list of visual parameters from a sorted list, a reduced input model (ontology) of the second visual parameter specification is defined.

According to an example embodiment of the present invention, the computer-implemented method for modifying a first visual parameter specification to provide a second visual parameter specification, wherein the second visual parameter specification is used to provide training data for training a computer vision model.

A second aspect of the present invention provides a computer-implemented method for providing a set of training data. In accordance with an example embodiment of the present invention, the method includes:

obtaining the second visual parameter specification generated according the first aspect, or its embodiments; and obtaining a training data set, wherein the training data set is obtained by one or a combination of:

generating, using a synthetic visual data generator, a synthetic training data set comprising synthetic visual data and groundtruth data synthesized according to the second visual parameter specification; and/or sampling items of visual data from a database comprising specimen images associated with corresponding items of groundtruth data according to the second visual parameter set; and/or specifying experimental requirements according to the second visual parameter set, and performing live experiments to obtain the training data set; and outputting the training data set.

Advantageously, training data is generated that is less likely to lead to unpredictable performance of a computer vision model during training, resulting in an improved computer vision model.

A third aspect of the present provides a computer-implemented method for training a computer vision model. In accordance with an example embodiment of the present invention, the method includes:

obtaining a further computer vision model configured to perform a computer vision function characterising elements of observed scenes; and obtaining a training data set as generated according to the second aspect, and training the computer vision model using the training data set.

Advantageously, a more predictably trained computer vision model can be provided.

A fourth aspect of the present invention provides an apparatus a computer-implemented method for modifying a first visual parameter specification to provide a second visual parameter specification characterising a computer vision model comprising an input interface, a processor, a memory, and an output interface.

In accordance with an example embodiment of the present invention, the input interface is configured to obtain a computer vision model configured to perform a computer vision function characterising elements of observed scenes, and to obtain a first visual parameter specification comprising at least one initial visual parameter set, wherein generating an item of visual data based on the extent of the at least one visual parameter set is capable of affecting a classification or regression performance of the computer vision model.

The processor is configured to provide a visual data set compliant with the first visual parameter specification, wherein the visual data set comprises a subset of items of visual data, and a corresponding subset of items of groundtruth data, and to applying the subset of items of visual data to the computer vision model to obtain a plurality of performance scores characterizing the performance of the computer vision model for a plurality of items of visual data and the corresponding groundtruth data, to perform a sensitivity analysis of the plurality of performance scores over a domain of the first visual parameter specification, and to generate a second visual parameter specification comprising at least one updated visual parameter set, wherein the at least one initial visual parameter set is modified based on the outcome of the sensitivity analysis.

A fifth aspect of the present invention provides computer program comprising machine-readable instructions which, when executed by a processor, is capable of carrying out either (i) the computer-implemented method according to the first aspect, or (ii) the computer-implemented method according to the second aspect, or (iii) the computer-implemented method according to the third aspect A sixth aspect of the present invention provides a computer readable medium comprising at least one of the computer programs according to the fifth aspect Other embodiments of the aforementioned aspects are disclosure herein and explained in the following description, to which the reader should now refer.

The present definitions have general applicability to this specification.

A visual data set of the observed scenes is a set of items representing either an image such as JPEG or GIF images, or a video. A video is a sequence of images, optionally encoded as necessary in a format such as MPEG.

A computer vision model is a function parametrized by model parameters. The model parameters are learned, using, for example, machine learning techniques during training based on the training data set using machine learning techniques. The computer vision model is configured to at least map an item of visual data or a portion, or subset thereof to a prediction. One or more visual parameters define a visual state in that they contain information about the contents of the observed scene and/or represent boundary conditions for capturing and/or generating the observed scene.

An item of groundtruth data corresponding to one item of visual data is a classification and/or regression result that the computer vision model is intended to output in response to an image input, when performing correctly. In other words, the groundtruth data represents a correct, or tolerably accurate, result of the computer vision model when input with an item of visual data showing a predictable scene or element of a scene. The term image may relate to a subset of an image, such as a segmented road sign or obstacle.

A visual data set of the observed scenes is a set of items representing either an image or a video, the latter being a sequence of images. Each item of visual data can be a numeric tensor with a video having an extra dimension for the succession of frames. An item of groundtruth data corresponding to one item of visual data is, for example a classification and/or regression result that the computer vision model should output in ideal conditions. For example, if the item of visual data is parameterized in part according to the presence of a wet road surface, and the presence, or not of a wet road surface is an intended output of the computer model to be trained, the groundtruth would return a description of that item of the associated item of visual data as comprising an image of a wet road.

Each item of groundtruth data can be another numeric tensor, or in a simpler case a binary result vector, associated with or referenced to an item in the visual data set. The groundtruth data provides a definitive result concerning an element of a scene in its associated visual data. For example, an item of visual data comprising an image of a 20 km/h speed limit sign would be associated with a result vector confirming that the scene contains a road sign, with further levels of detail being that the road sign is a speed limit sign, that the displayed speed limit is 20 km/h. In this way, the output prediction of a computer vision model applied to the item of visual data can be assessed for correctness by comparison to the associated groundtruth data, and a performance measure of the computer vision model calculated.

Exemplary embodiments of the present invention are depicted in the figures, which are not to be construed as limiting, and are explained in greater detail below.

BRIEF DESCRIPTION OF THE DRAWINGS

FIGS. 5A and 5B schematically illustrate an example of subdividing parameter ranges, in accordance with the present invention.

DETAILED DESCRIPTION OF EXAMPLE EMBODIMENTS

Figure 1:
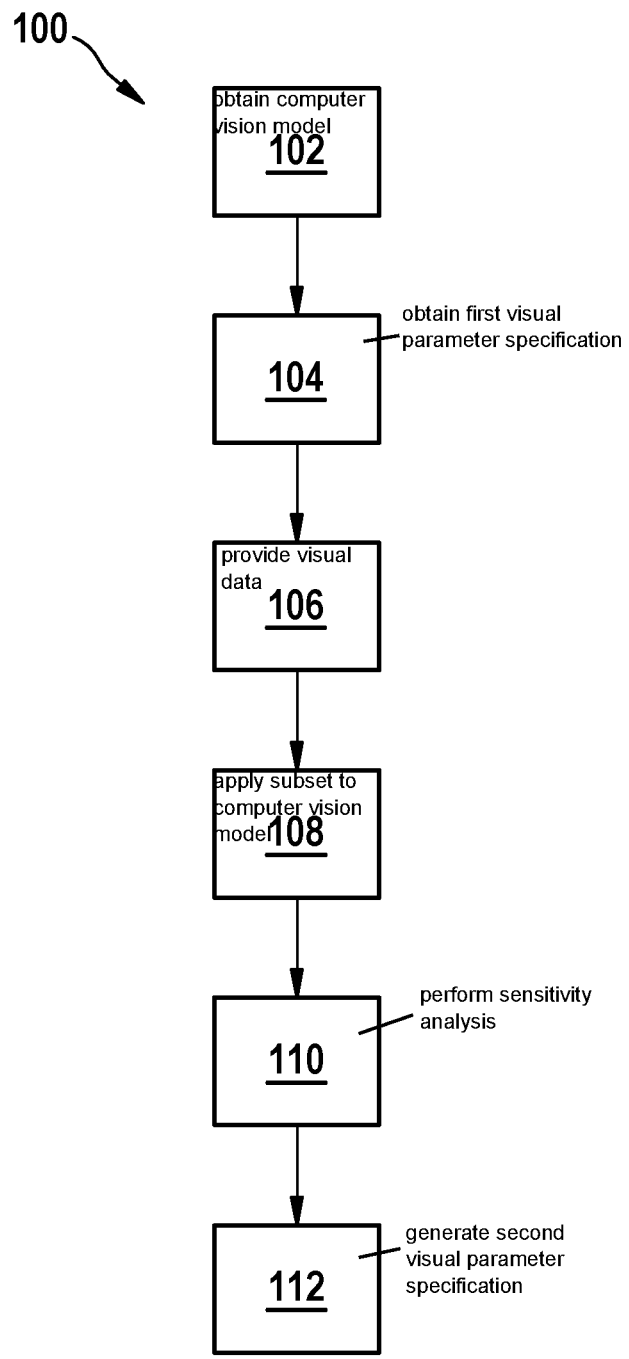
FIG. 1 schematically illustrates an example computer-implemented method according to the first aspect of the present invention.

One or more visual parameters define a visual state of a scene because it or they contain information about the contents of the observed scene and/or represent boundary conditions for capturing and/or generating the observed scene. A typical scene is characterized by a large number of visual parameters, some of which are continuous variables. Therefore, the search space for computing functions over the total number of visual parameters characterizing a typical scene is onerous.

The visual parameters can be for example: camera properties (e.g., spatial- and temporal-sampling, distortion, aberration, colour depth, saturation, noise etc.), LIDAR or RADAR properties (e.g., absorption), light conditions in the scene (light bounces, reflections, reflectivity of surfaces, light sources, fog and light scattering, overall illumination, etc.), materials and textures, objects and their position, size, and rotation, geometry (of objects and environment), parameters defining the environment, environmental characteristics like seeing distance, precipitation-characteristics, radiation intensities (which are suspected to strongly interact with the detection process and may show strong correlations with performance), image characteristics/statistics (such as contrast, saturation, noise, etc.), domain-specific descriptions of the scene and situation (e.g., cars and objects on a crossing), etc. Many more parameters are possible.

These parameters can be seen as an ontology, taxonomy, dimensions, or language entities. They can define a restricted view on the world or an input model. A set of concrete images can be captured or rendered given an assignment/a selection of visual parameters, or images in an already existing dataset can be described using the visual parameters. The advantage of using an ontology or an input model is that for testing an expected test coverage target can be defined in order to define a test end-criterion, for example using t-wise coverage, and for statistical analysis a distribution with respect to these parameters can be defined.

Images, videos, and other visual data along with co-annotated other sensor data (GPS-data, radiometric data, local meteorological characteristics) can be obtained in different ways. Real images or videos may be captured by an image capturing device such as a camera system. Real images may already exist in a database and a manual or automatic selection of a subset of images can be done given visual parameters and/or other sensor data. Visual parameters and/or other sensor data may also be used to define required experiments. Another approach can be to synthesize images given visual parameters and/or other sensor data. Images can be synthesized using image augmentation techniques, deep learning networks (e.g., Generative Adversarial Networks (GANs), Variational Autoencoders (VAEs)), and 3D rendering techniques. A tool for 3D rendering in the context of driving simulation is for example the CARLA tool (Koltun, 2017, available at www.arXiv.org: 1711.03938).

Conventionally, in development and testing of computer vision models, the input images are defined, selected, or generated based on properties (visual parameters) that seem important according to expert opinion. However, the expert opinion relating to the correct choice of visual parameters may be incomplete, or mislead by assumptions caused by the experience of human perception. Human perception is based on the human perception system (human eye and visual cortex), which differs from the technical characteristics of detection and perception using a computer vision model.

Conventionally, the computer vision model may be developed, trained, or tested on image properties which are not relevant, and visual parameters which are important influence factors may be missed or underestimated. Furthermore, a technical system can detect additional characteristics as polarization, or extended spectral ranges that are not perceivable by the human perception system.

A computer vision model for an autonomous system is a safety-critical component. A computer vision model is configured to receive an input image or sequence of images, to apply a computer vision function to the input image or sequence of images using the computer vision model, and to output a computer vision result. For example, the result could be a regression or recognition result of an element within a scene depicted by the input image or sequence of images. To ensure safety, and for liability reasons, the definition of a visual parameter specification (sometimes termed an operational design domain) integrates with a computer vision model to provide a safety guarantee. Defining the operational design domain, because the interaction of the computer vision model with its training data, is complex.

FIG. 1 schematically illustrates a computer-implemented method 100 according to the first aspect.

The first aspect provides a computer-implemented method for modifying a first visual parameter specification to provide a second visual parameter specification applicable to providing data for the training of a computer vision model, wherein the method comprises:
  obtaining 102 a computer vision model 16 configured to perform a computer vision function characterising elements of observed scenes;
  obtaining 104 a first visual parameter specification comprising at least one initial visual parameter set, wherein an item of visual data provided based on the extent of the at least one visual parameter set is capable of affecting a classification or regression performance of the computer vision model;
  providing 106 a visual data set comprising a subset of items of visual data compliant with the first visual parameter specification, and a corresponding subset of items of groundtruth data;
  applying 108 the subset of items of visual data to the computer vision model to obtain a plurality of performance scores characterizing the performance of the computer vision model when applied to the subset of items of visual data of the visual data set, using the corresponding groundtruth data;
  performing 110 a sensitivity analysis of the plurality of performance scores over a domain of the first visual parameter specification; and
  generating 112 a second visual parameter specification comprising at least one updated visual parameter set, wherein the at least one initial visual parameter set is modified based on the outcome of the sensitivity analysis to provide the at least one updated visual parameter set.

The computer vision model 16 is, for example, a deep neural network (DNN) comprising a plurality of neural net layers. However, other model topologies conventional to a skilled person may also be implemented according to the present technique. The layers compute latent representations which are higher-level representation of the input image or video sequence.

The first visual parameter specification is, for example, a data structure defining different types of visual phenomena that can affect the performance of a computer vision model performing a function such as, for example, image or video recognition, classification, or regression on a scene, or a portion of the scene. The visual phenomena are encoded by one or more visual parameter sets. For example, a visual parameter set may define parameters as a series of discrete values, such as precipitation intensity. A visual parameter set may define parameters using Boolean conditions, such as a Boolean condition defining the presence or absence of tree cover. Alternatively or in addition, a visual parameter set may define parameters using continuous ranges, such as azimuth angle displacements.

Sampling a set of values within the boundaries defined by a visual parameter specification enables items of visual data to be provided that are compliant with the visual parameter specification.

The visual parameter specification may be considered to represent an ontology, taxonomy, dimensions, or language entities defining a restricted view on the world, or an input model. A set of concrete images can be captured (from a real image dataset) or rendered (using a synthetic image generation engine) using the visual parameters.

In an embodiment, the visual parameters of the first or second visual parameter specification may comprise one or any combination selected from the following list: one or more parameters describing a configuration of an image capture arrangement, optionally an image or video capturing device, visual data is taken in or synthetically generated for, optionally, spatial and/or temporal sampling, distortion aberration, colour depth, saturation, noise, absorption, one or more light conditions in a scene of an image/video, light bounces, reflectivity of surfaces, reflections, light sources, fog and light scattering, overall illumination; and/or one or more features of the scene of an image/video, optionally, one or more objects and/or their position, size, rotation, geometry, materials, textures, one or more parameters of an environment of the image/video capturing device or for a simulative capturing device of a synthetic image generator, optionally, environmental characteristics, seeing distance, precipitation characteristics, radiation intensity, image characterizing statistics such as contrast, saturation, noise, or one or more domain-specific descriptions of the scene of an image/video, optionally, one or more cars or road users, or one or more objects on a crossing.

In an embodiment, the domain of the first visual parameter specification comprises a subset, in a finite-dimensional vector space, of numerical representations that visual parameters are allowed to lie in, optionally a multi-dimensional interval of continuous or discrete visual parameters, or a set of numerical representations of visual parameters in the finite-dimensional vector space.

Box 1 is a practical example of a visual parameter specification. Each of the bracketed text strings such as "spawn_point", "cam_yaw" are examples of an initial visual parameter set. In the example of box 1, the values of the initial visual parameter specification are a series of discrete values, although alternatively at least one of the visual parameter specification may comprise a range between at least two endpoints. Alternatively, at least one visual parameter set of the visual parameter specification may comprise a plurality of ranges (not illustrated in Box 1).

Box 1 - example of a first visual parameter specification in "Python"

```
worldmodel = OrderedDict([  ('spawn_point', [0,3,6,9,12,15]),
                            ('cam_yaw', [-20, -10, 0, 10, 20]),
                            ('cam_pitch', [-10, -5, 0, 5, 10]),
                            ('cam_roll', [-10, -5, 0, 5, 10]),
                            ('cloudyness', [0, 33, 66, 100]),
                            ('precipitation', [0, 50, 100]),
                            ('precipitation_deposits', [0, 50, 100]),
                            ('sun_altitude_angle', [-10, 0, 33, 66, 100]),
                            ('sun_azimuth_angle', [0, 45, 90, 135, 180, 225, 270]),
])
```

Images for training a computer vision model 16 are obtained based on the second visual parameter specification. In order for the computer vision model 16 to provide a predictable characterisation of elements in a real scene, it should be trained on representative data. Typically, the visual parameter specification of Box 1 is defined according to the opinion of an expert. However, the expert may have an incorrect opinion, or be biased. In this case, a computer vision model could be trained on biased training data.

According to the present specification, an updated or second visual parameter specification is returned following an optimization process. The second visual parameter specification is automatically modified according to the computer implemented method of the first aspect to ensure that, when visual data is obtained compliant with the definition of the second visual parameter specification, is not badly conditioned when applied to the computer vision model 16.

Many different modifications to the visual parameter sets can be made. For example, at least one element of a visual parameter set can be deleted, increased, decreased, or added. In Box 2, the "cloudiness" and "precipitation parameters have been reduced in upper scope to 85 down from 100, and the "sun altitude angle" parameter has been reduced in scope by removal of its final element. The "precipitation" parameter has been upsampled with the addition of two additional elements. The entire "cam yaw" parameter has been deleted. The foregoing is a specific example of how the visual parameter specification is automatically altered and many variations are possible.

Box 2 - example of a second visual parameter specification

```
worldmodel = OrderedDict([  ('spawn_point', [0,3,6,9,12,15]),
                            (~~'cam_yaw', [-20, -10, 0, 10, 20]~~),
                            ('cam_pitch', [-10, -5, 0, 5, 10]),
                            ('cam_roll', [-10, -5, 0, 5, 10]),
                            ('cloudyness', [0, 33, 66, 85 ~~100~~]),
                            ('precipitation', [0, 50, 70, 75, 80, 85 ~~, 100~~]),
                            ('precipitation_deposits', [0, 50, 100]),
                            ('sun_altitude_angle', [-10, 0, 33, 66 ~~, 100~~]),
                            ('sun_azimuth_angle', [0, 45, 90, 135, 180, 225, 270]),
])
```

Figure 2:
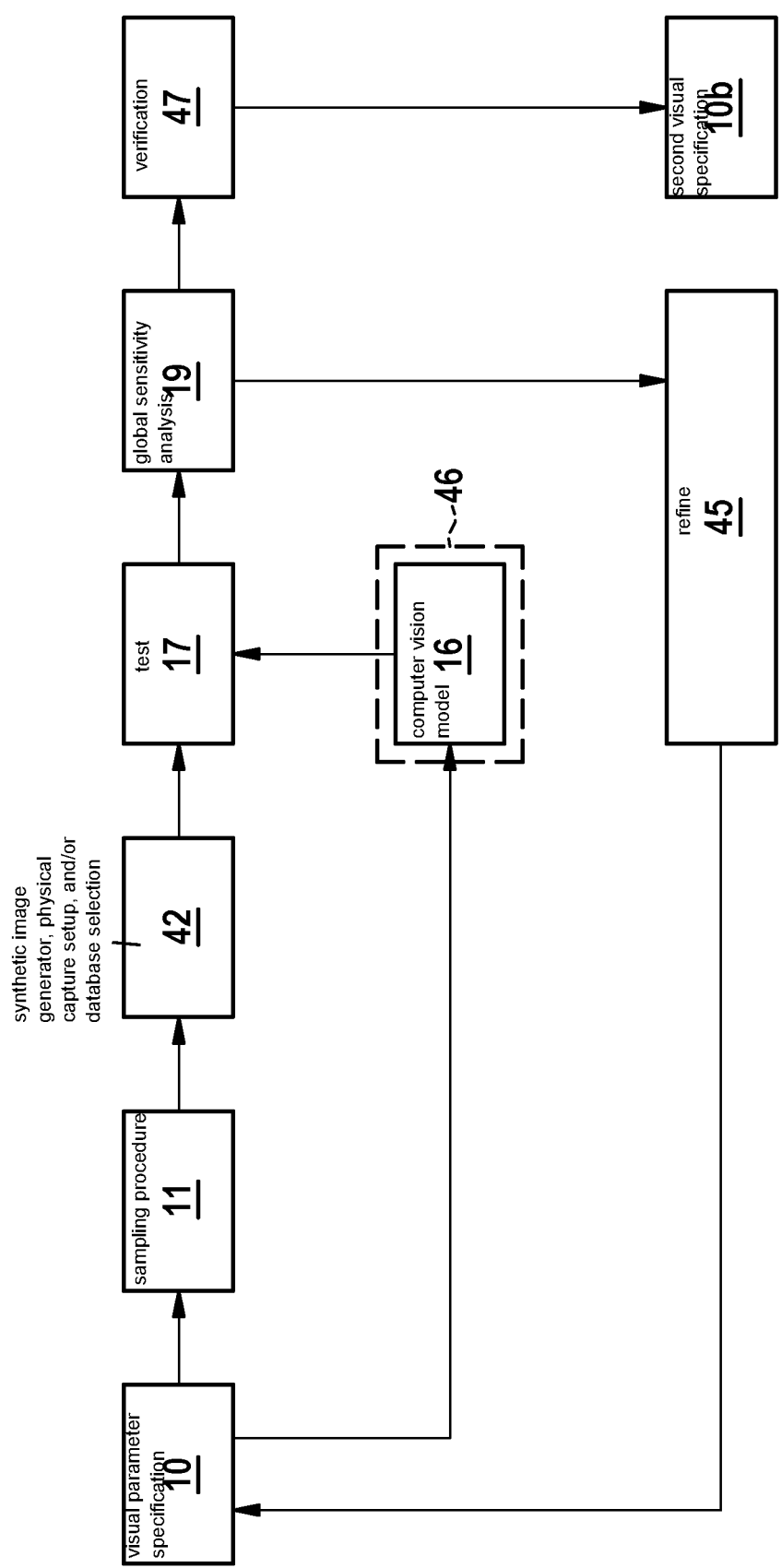
FIG. 2 schematically illustrates an example of an automatic implementation of the first aspect for analyzing a first visual parameter specification, in accordance with the present invention.

FIG. 2 schematically illustrates an example of an automatic implementation of the first aspect for analyzing a first visual parameter specification. A detailed description of an operation example of the method according to the first aspect is now provided.

As an example, a set of initial visual parameters and values or value ranges for the visual parameters in a given scenario can be defined (e.g. by experts). A simple scenario would have a first parameter defining various sun elevations relative to the direction of travel of the ego vehicle, although, as will be discussed later, a much wider range of visual parameters is possible.

A sampling procedure 11 generates a set of assignments of values to the visual parameter specification 10 (world model, ODD). Optionally, the parameter space defined by the visual parameter specification is randomly sampled according to a Gaussian distribution. Optionally, the visual parameters are oversampled at regions that are suspected to define performance corners of the computer vision model 16. Optionally, the visual parameters are under sampled at regions that are suspected to define predictable performance of the computer vision model 16. Accordingly, in an embodiment, providing a visual data set compliant with the first visual parameter set further comprises sampling the at least one initial visual parameter set comprised in the first visual parameter specification to obtain a set of sampled initial visual parameter values, and obtaining the visual data set of initial visual parameter values using the set of sampled initial visual parameter values.

The next task is to acquire images in accordance with the visual parameter specification.

A synthetic image generator, a physical capture setup and/or database selection 42 can be implemented allowing the generation, capture or selection of images and corresponding items of groundtruth according to the visual parameters sampled during the sampling procedure 11.

Synthetic images are generated, for example, using the CARLA generator discussed previously. In the case of synthetic generation the groundtruth may be taken to be the sampled value of the visual parameter specification used to generate the given synthetic image.

The physical capture setup enables an experiment to be performed to obtain a plurality of test visual data within the parameter space specified. Alternatively, databases containing historical visual data archives that have been appropriately labelled may be selected.

In a testing step 17, images from the image acquisition step 42 are provided to a computer vision model 16. Optionally, the computer vision model is comprised within an autonomous vehicle or robotic system 46 as an example of a "hardware in the loop" test.

For each item of visual data input into the computer vision model 16, a predicted item of output data is obtained from the computer vision model 16. This represents a prediction of an element of a scene represented in the item of visual data input into the computer vision model 16. A performance score based, for example, on a comparison between the groundtruth and the predicted item of output data is calculated. The result is a plurality of performance scores according to the sampled values of the visual parameter specification.

Accordingly, in an embodiment, obtaining a plurality of performance scores further comprises generating, using the computer vision model, a plurality of predictions of elements of observed scenes in the subset of items of visual data, wherein the plurality of predictions comprise at least one prediction of a classification label and/or at least one regression value of at least one item in the subset of visual data, and comparing the plurality of predictions of elements in the subset of items of visual data with the corresponding subset of groundtruth data, to thus obtain the plurality of performance scores.

In an embodiment, the performance score comprises, or is based on, any one or combination, of the list of a confusion matrix, a precision score, a recall score, an F1 score, a union intersection score, or a mean average score; and/or wherein the computer vision model is a neural network, or a neural-network-like model.

A global sensitivity analysis 19 is performed on the performance scores with respect to the visual parameters 10. The global sensitivity analysis 19 determines the relevance of visual parameters of the visual parameter specification to the performance of the computer vision model 16.

As an example, for each visual parameter, a variance of performance scores is determined. Such variances are used to generate and/or display a ranking of visual parameters. This information can be used to modify the set of initial visual parameters 10 of the visual parameter specification.

Accordingly, in an embodiment, performing the sensitivity analysis further comprises computing a plurality of variances of respective performance scores of the plurality of performance scores with respect to the initial visual parameters of the first visual parameter specification; and ranking the initial visual parameters of the first visual parameter specification based on the computed plurality of variances.

Optionally, clusters of conditions may be generated according to the global sensitivity analysis 19. For example, if a first Boolean visual parameter "the camera is looking towards the sun" and a second Boolean visual parameter "the road is wet" are asserted, then the performance of the computer vision model 16 may be low, and the first and second visual parameters both receive a high ranking.

The testing step 17 and the global sensitivity analysis 19 and/or retraining the computer vision model 16 can be repeated. Optionally, the performance scores and variances of the performance score are tracked during such training iterations. The training iterations are stopped when the variances of the performance score appear to have settled (stopped changing significantly). Optionally, irrelevant visual parameters may be iteratively modified or removed from subsequent versions of the visual parameter specification. Optionally, tests of higher resolution may be applied to parts of the visual parameter specification considered to be important for the performance of the function 16.

A refining step 45 uses the results of the global sensitivity analysis 19 to modify at least one initial visual parameter of the visual parameter specification, to thus yield a second visual parameter specification. When the second visual parameter specification is sampled 11 and visual data is obtained 42, a plurality of the items of visual data obtained according to the second visual parameter specification have an improved performance score.

As an example, a visual parameter with performance scores having a lower variance may be removed from the set of visual parameters. Alternatively, another set of visual parameters may be added if performance scores improve above a threshold. A range of at least one visual parameter may be enlarged or reduced. Many different types of modification to the first visual parameter specification may be performed.

Accordingly, an embodiment further comprises identifying, at least one initial visual parameter set of the first visual parameter specification using the plurality of performance scores, and generating the second visual parameter specification comprises modifying the at least one initial visual parameter set by enlarging or shrinking the scope of the at least one initial visual parameter set on its domain to thus yield a modified visual parameter set.

Generally, different sets of visual parameters (defining the world model or ontology) for testing or statistically evaluating the computer vision model 16 can be defined and their implementation or exact interpretation may vary. This methodology enforces decision making based on empirical results 19, rather than experts' opinion alone and it enforces concretization 42 of abstract parameters 10. Experts can still provide visual parameters as candidates 10.

FIG. 2 also illustrates an optional visual parameter specification verification step 47. Based on a selection of the most relevant parameters and value ranges, the second visual parameter specification is sampled, for example using combinatorial testing, search-based testing, or statistical methods. Optionally, the test space is partitioned into value ranges and combinations where the performance of the computer vision model 16 is categorised (for example, good, bad, or variable). A variable categorisation means that within a partition, the performance of the computer vision model 16 is variable.

The visual parameter specification verification step 47 is different to the testing performed previously performed by the combination of sampling procedure 11, visual data obtaining step 42, and testing step 17, because other sampling algorithms and other metrics (such as test oracles) may be used, and the dimensionality of the input space smaller. This allows a much higher density of tests given the input space. The goal of the sensitivity analysis is to achieve this reduction of dimensionality in the verification test space.

Accordingly, in an embodiment, there is provided a process of verifying 47 the second visual parameter specification 10b by sampling the second visual parameter specification, providing a further visual dataset comprising a subset of items of visual data compliant with the second visual parameter specification based on the samples of the second visual parameter specification, and a corresponding subset of items of groundtruth data, and testing the subset of items of visual data on the computer vision model 16 according to a reduced dimensionality input space to provide a verification result of the second visual parameter specification with reduced complexity.

In this way, optional outputs of a second visual parameter specification that may function as a safety specification based on a previously hypothesised specification is provided. In subsequent training steps of a further computer vision model, the second visual parameter specification may be sampled to provide visual data upon which to train the further computer vision model. A ranking of visual parameters and value intervals is another optional output.

Figure 3:
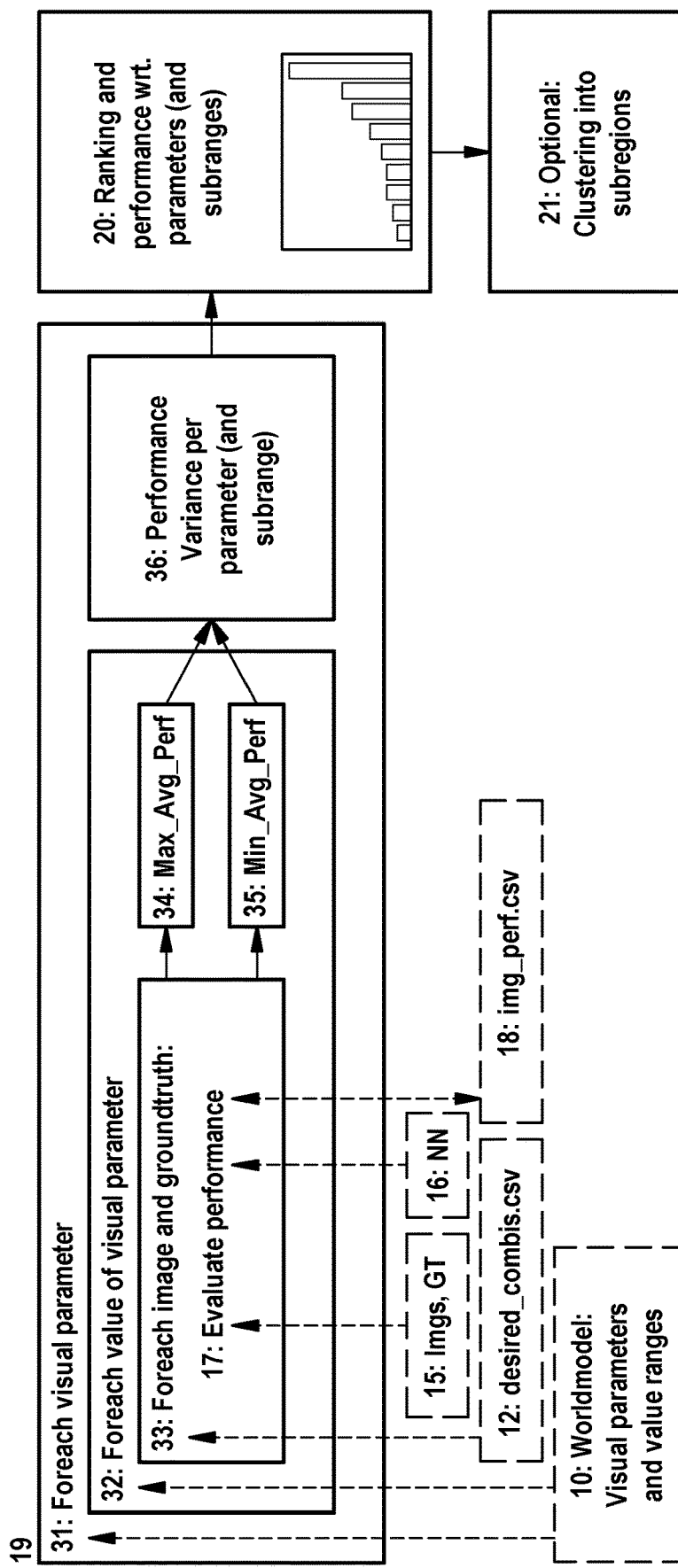
FIG. 3 schematically illustrates an example of a sensitivity analysis function, in accordance with the present invention.

FIG. 3 schematically illustrates an example of a sensitivity analysis function 19.

In general, sensitivity analysis (or global sensitivity analysis) can be seen as the numeric quantification of how the uncertainty in the output of a model or system can be divided and allocated to different sources of uncertainty in its inputs. This quantification can be referred to as sensitivity, or robustness. In the context of this specification, the model can, for instance, be taken to be the mapping from visual parameters based on which items of visual data have been captured/generated/selected to yield performance scores based on a comparison between the groundtruth and the predictions. An important result of the sensitivity analysis can be a variance of performance scores for each visual parameter. The larger a variance of performance scores for a given visual parameter, the more performance scores vary for this visual parameter. This indicates that the computer vision model is more unpredictable based on the setting of this visual parameter.

In the context of this specification, the model can, for instance, be taken to be the mapping, $$\Phi: X \to Y$$

from visual parameters (or visual parameter coordinates) $X_i$, i=1, ..., n based on which items of visual data have been captured/generated/selected to yield performance scores (or performance score coordinates) $Y_j$, j=1, ..., m based on the true and predicted items of groundtruth (i.e. based on predictions and groundtruth). If m is equal to one, there is only one performance score. However, m can be greater than one.

A variance-based sensitivity analysis, sometimes also referred to as the Sobol method or Sobol indices is a particular kind of (global) sensitivity analysis. To this end, samples of both input and output of the aforementioned mapping $\Phi$ can be interpreted in a probabilistic sense. In fact, as an example a (multi-variate) empirical distribution for input samples can be generated. Analogously, for output samples a (multi-variate) empirical distribution can be computed. A variance of the input and/or output (viz. of the performance scores) can thus be computed. Variance-based sensitivity analysis is capable of decomposing the variance of the output into fractions which can be attributed to input coordinates or sets of input coordinates. For example, in case of two visual parameters (i.e. n=2), one might find that 50% of the variance of the performance scores is caused by (the variance in) the first visual parameter ($X_1$), 20% by (the variance in) the second visual parameter ($X_2$), and 30% due to interactions between the first visual parameter and the second visual parameter. For n>2 interactions arise for more than two visual parameters. Note that if such interaction turns out to be significant, a combination between two or more visual parameters can be promoted to become a new visual dimension and/or a language entity. Variance-based sensitivity analysis is an example of a global sensitivity analysis.

Hence, when applied in the context of this specification, an important result of the variance-based sensitivity analysis is a variance of performance scores for each visual parameter. The larger a variance of performance scores for a given visual parameter, the more performance scores vary for this visual parameter. This indicates that the computer vision model is more unpredictable based on the setting of this visual parameter. Unpredictability when training the computer vision model 16 may be undesirable, and thus visual parameters leading to a high variance can be de-emphasized or removed when training the computer vision model.

In the context of this specification, the model can, for instance, be taken to be the mapping from visual parameters based on which items of visual data have been captured/generated/selected to yield performance scores based on the true and predicted items of groundtruth. An important result of the sensitivity analysis can be a variance of performance scores for each visual parameter. The larger a variance of performance scores for a given visual parameter, the more performance scores vary for this visual parameter. This indicates that the computer vision model is more unpredictable based on the setting of this visual parameter.

The example of the sensitivity analysis function 19 of FIG. 3 operates on the performance scores output from the computer vision model 16 in combination with the original items of visual data (image) and their groundtruth 15. The performance 17 of the computer vision model 16 is evaluated for each pair of image and groundtruth, yielding a maximum average performance 34 and a minimum average performance 35 for each pair of image and ground truth.

Optionally, at least one of either the maximum average performance 34 and a minimum average performance 35 are evaluated for each image and groundtruth pair provided using the same visual parameter 32, or both of the maximum average performance 34 and a minimum average performance 35. This enables a performance variance per parameter (and subbranch) 36 to be calculated. The sensitivity analysis function 19 is iterated over a plurality of visual parameters in the first visual parameter specification.

It is not essential that the sensitivity analysis function 19 is iterated over every visual parameter in the first visual parameter specification. Accordingly, a performance variance per parameter 36 (and optionally subrange) is calculated for a plurality of parameters in the first visual parameter specification.

The performance variance per parameter 36 enables a ranking of performance with respect to parameters (and sub-ranges) to be performed in a ranking unit 20. Optionally, multiple parameters may affect the performance of the computer vision model 16, and these may be clustered into subregions to be performed in a clustering unit 21.

Figure 4:
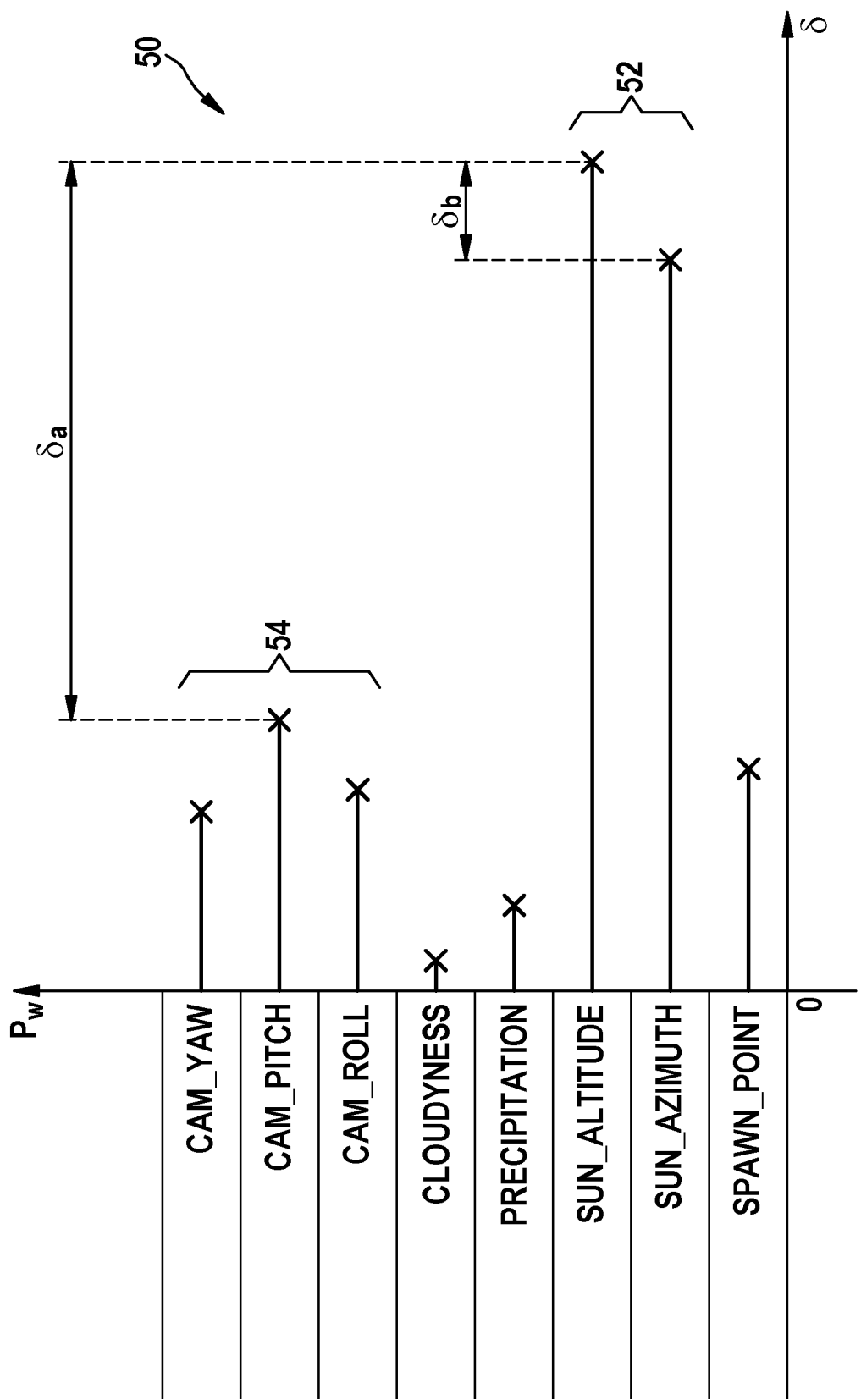
FIG. 4 schematically illustrates clustering visual parameter sets, in accordance with an example embodiment of the present invention.

FIG. 4 schematically illustrates an example of clustering visual parameter sets. In FIG. 4, the X-axis of the graph 50 represents a sensitivity of the performance of a computer vision model 16 to a given parameter. The Y-axis enumerates visual parameters of the visual parameter specification shown in Box 1 above.

The visual parameters "sun_altitude" and "sun_azimuth" form a first visual parameter cluster 52. The visual parameters "cam_yaw", "cam_pitch", "cam_roll" form a second visual parameter cluster 54. The clusters are identifiable because the sensitivity scores of each visual parameter in the first and second cluster meet an identification condition.

An identification condition is that a difference $\delta_b$ of the magnitude of the two performance scores of "sun_altitude" and "sun_azimuth" is small compared to the prominence of the "sun_altitude" performance score relative to the next largest cluster 54 as measured by distance $\delta_a$. This, therefore, constitutes an identification condition enabling the computer implemented method to group the visual parameters "sun_altitude" and "sun_azimuth" as a first cluster in the second visual parameter specification.

FIGS. 5A and 5B schematically illustrate an example of subdividing parameter ranges. FIG. 5A schematically illustrates a plurality of performance scores resulting from a first visual parameter specification prior to subdivision. The identification condition can be evaluated by assessing the ratio of $\delta_c/(\delta_c+\delta_d)$. If the ratio is below an identification threshold for a given subset of the visual parameters, then this subset of the visual parameters is a candidate for decomposition. As shown in FIG. 5A, the subset of visual parameters "sun_altitude" and "sun_azimuth" form a visual parameter cluster 52 that appear to have a considerably larger effect on the sensitivity of the performance of the computer vision model 16 than any of the other visual parameters.

FIG. 5B schematically illustrates an example of subdivided parameter ranges. In this case, the "sun_altitude" and "sun_azimuth" have been automatically subdivided into four and three sub-ranges, respectively. Metadata accompanying the visual parameters state that the domain of the "sun_altitude" visual parameter is between 0° and 90°. Metadata accompanying the visual parameters state that the domain of the "sun_azimuth" visual parameter is between 0° and 359°. Accordingly, the method calculates appropriate subdivisions of the parameter ranges.

Optionally, a user may input a suggestion for subdividing into sub-ranges via a graphical user interface. Optionally, a proposed subdivision may be automatically proposed to a user via a graphical user interface, with the proposed subdivision being applied to the second visual parameter specification upon user agreement.

In an example, once the subdivisions of the parameter ranges have been calculated, the corpus of performance scores output from the computer vision model 16 in combination with the original items of visual data (image) and their groundtruth 15 that were previously calculated are resampled according to the subdivided visual parameter ranges. Therefore, the subdivided visual parameter ranges return more detail about the sensitivity of sub-ranges of the visual parameter specification.

Optionally, the subdivided visual parameter ranges are incorporated into the second visual parameter specification.

Accordingly, an embodiment further comprises identifying, based on an identification condition, at least one initial visual parameter set of the first visual parameter specification using the plurality of performance scores. Generating the second visual parameter specification comprises modifying the at least one initial visual parameter set by dividing the at least one initial visual parameter set into at least a first and a second modified visual parameter set, or combining a first and a second visual parameter set into a cluster.

A specific embodiment of the first aspect concerns the step of sampling the first visual parameter specification.

The sampling of the at least one initial visual parameter set is performed using combinatorial testing, or by Latin hypercube sampling. One example of the implementation of a pairwise sampling function for implementing combinatorial sampling over the visual parameters of the visual parameter specification is given in Box 3.

---

Box 3 - example "Python" code implementing a pairwise sampling function 11 of the first visual parameter specification

```
# The sampling algorithm corresponds to (11)
#wmPairs = { k:[ ] for k in worldmodel.keys( ) }
df = DataFrame(columns=worldmodel.keys( ))
#Ensure that projection on each dimension still guarantees pair-wise coverage
on the subspace
    for dim in worldmodel.keys( ):
        for dim_val in worldmodel[dim]:
            wm_subspace = worldmodel.copy( )
            wm_subspace[dim] = [dim_val]
```

-continued

Box 3 - example "Python" code implementing a pairwise sampling
function 11 of the first visual parameter specification

```
for row in AllPairs(wm_subspace.values( )):
    df.loc[len(df)] = row
df.drop_duplicates( )
#The output is df and corresponds to (12) desired_combis.csv
```

Advantageously, such a sampling technique enables a good coverage of the overall parameter space, with an efficient number of computations. In particular, a brute-force sampling of the parameter space is not required. Accordingly, the technique of the present specification firstly enables a large parameter space to be sampled using, for example, combinatorial testing to determine the performance of a sensitivity analysis.

The outcome of a sensitivity analysis is a first reduction in search space complexity by providing a second visual parameter specification having visual parameters that are most relevant to the performance of the computer vision model. Then, in an optional verification step 47, the second visual parameter specification may again be sampled according to a technique such as combinatorial testing, to enable a further reduction in the search space and an improvement in efficiency when verifying the second visual parameter specification.

In an embodiment, there is provided displaying, via a graphical user interface displayed on output interface, a graphical representation of the second visual parameter specification to a user, optionally in combination with a graphical representation of the first visual parameter specification, and optionally in combination with a graphical representation of the outcome of the sensitivity analysis.

In an embodiment, there is provided generating a third visual parameter specification as a consequence of an interactive user amendment to the graphical representation of the second visual parameter specification via the graphical user interface.

A fourth aspect provides an apparatus for testing a conformance between images generated by a synthetic image generator and images obtained from authentic visual data, comprising an input interface, a processor, a memory, and an output interface.

The input interface is configured to obtain a computer vision model configured to perform a computer vision function characterising elements of observed scenes, and to obtain a first visual parameter specification comprising at least one initial visual parameter set, wherein generating an item of visual data based on the extent of the at least one visual parameter set is capable of affecting a classification or regression performance of the computer vision model.

The processor is configured to provide a visual data set compliant with the first visual parameter specification, wherein the visual data set comprises a subset of items of visual data, and a corresponding subset of items of groundtruth data, and to applying the subset of items of visual data to the computer vision model to obtain a plurality of performance scores characterizing the performance of the computer vision model for a plurality of items of visual data and the corresponding groundtruth data, to perform a sensitivity analysis of the plurality of performance scores over a domain of the first visual parameter specification, and to generate a second visual parameter specification comprising at least one updated visual parameter set, wherein the at least one initial visual parameter set is modified based on the outcome of the sensitivity analysis.

Figure 6:
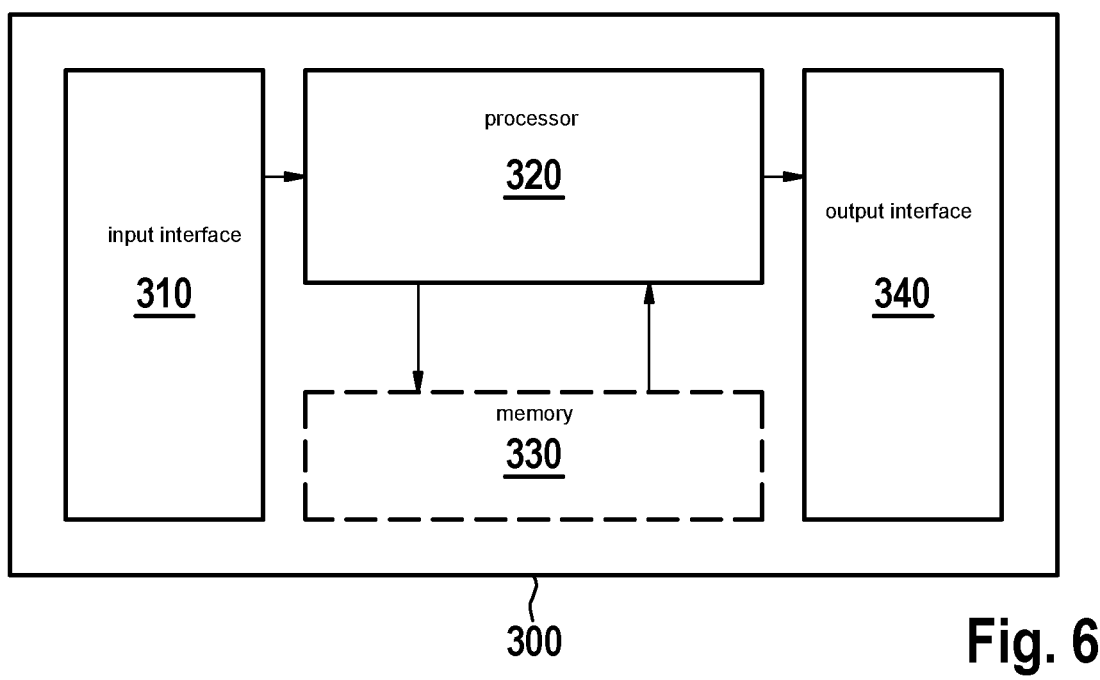
FIG. 6 schematically illustrates an example apparatus according to the fourth aspect of the present invention.

FIG. 6 schematically illustrates an apparatus 300 according to the fourth aspect. In an example, the data processing apparatus 300 is a personal computer, server, cloud-based server, or embedded computer. It is not essential that the processing occurs on one physical processor. For example, it can divide the processing task across a plurality of processor cores on the same processor, or across a plurality of different processors, or virtual machines. The processor may be a Hadoop™ cluster, or provided on a commercial cloud processing service. A portion of the processing may be performed on non-conventional processing hardware such as a field programmable gate array (FPGA), an application specific integrated circuit (ASIC), one or a plurality of graphics processors, application-specific processors for machine learning, and the like.

The memory 330 of the apparatus 300 stores a computer program according to the fourth aspect that, when executed by the processor 320, causes the processor 320 to execute the functionalities described by the computer-implemented methods according to the first and second aspects. According to an example, the input interface 310 and/or output interface 340 is one of a USB interface, an Ethernet interface, a WLAN interface, or other suitable hardware capable of enabling the input and output of data samples from the apparatus 300. In an example, the apparatus 300 further comprises a volatile and/or non-volatile memory system 330 configured to receive input observations as input data from the input interface 310.

In an example, the apparatus 300 is an automotive embedded computer comprised in a vehicle, in which case the automotive embedded computer may be connected to sensors and actuators present in the vehicle. For example, the input interface of the apparatus may interface with one or more of an engine control unit providing velocity, fuel consumption data, battery data, location data and the like. For example, the output interface 340 of the apparatus 300 may interface with one or more of a plurality of brake actuators, throttle actuators, fuel mixture or fuel air mixture actuators, a turbocharger controller, a battery management system, the car lighting system or entertainment system, and the like.

A fifth aspect provides computer program comprising machine-readable instructions which, when executed by a processor, is capable of carrying out either (i) the computer-implemented method according to the first aspect, or (ii) the computer-implemented method according to the second aspect, or (iii) the computer-implemented method according to the third aspect A sixth aspect provides a computer readable medium comprising at least one of the computer programs according to the fifth aspect The examples provided in the drawings and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method for modifying a first visual parameter specification to provide a second visual parameter specification characterising a computer vision model, the method comprising the following steps:
obtaining a computer vision model configured to perform a computer vision function characterising elements of observed scenes;
obtaining a first visual parameter specification including at least one initial visual parameter set, wherein an item of visual data provided based on an extent of the at least one visual parameter set is capable of affecting a classification or regression performance of the computer vision model;
providing a visual data set includes a subset of items of visual data compliant with the first visual parameter specification, and a corresponding subset of items of groundtruth data;
applying the subset of items of visual data to the computer vision model to obtain a plurality of performance scores characterizing performance of the computer vision model when applied to the subset of items of visual data of the visual data set, using the corresponding groundtruth data;
performing a sensitivity analysis of the plurality of performance scores over a domain of the first visual parameter specification; and
generating a second visual parameter specification including at least one updated visual parameter set, wherein the at least one initial visual parameter set is modified based on an outcome of the sensitivity analysis to provide the at least one updated visual parameter set.

2. The computer-implemented method according to claim 1, wherein obtaining the plurality of performance scores further comprises:
generating, using the computer vision model, a plurality of predictions of elements of observed scenes in the subset of items of visual data, wherein the plurality of predictions include at least one prediction of a classification label and/or at least one regression value of at least one item in the subset of visual data; and
comparing the plurality of predictions of elements in the subset of items of visual data with the corresponding subset of groundtruth data, to obtain the plurality of performance scores.

3. The computer-implemented method according to claim 1, further comprising:
identifying, based on an identification condition, the at least one initial visual parameter set of the first visual parameter specification using the plurality of performance scores, and wherein the generating of the second visual parameter specification includes modifying the at least one initial visual parameter set by dividing the at least one initial visual parameter set into at least a first and a second modified visual parameter set, or combining a first and a second visual parameter set into a cluster.

4. The computer-implemented method according to claim 1, further comprising:
identifying, the at least one initial visual parameter set of the first visual parameter specification using the plurality of performance scores, and wherein the generating of the second visual parameter specification includes modifying the at least one initial visual parameter set by enlarging or shrinking a scope of the at least one initial visual parameter set on its domain to yield a modified visual parameter set.

5. The computer-implemented method according to claim 1, wherein the performing of the sensitivity analysis includes:
computing a plurality of variances of respective performance scores of the plurality of performance scores with respect to the initial visual parameters of the first visual parameter specification; and
ranking the initial visual parameters of the first visual parameter specification based on the computed plurality of variances.

6. The computer-implemented method according to claim 1, wherein the providing of the visual data set compliant with the first visual parameter specification includes:
sampling the at least one initial visual parameter set included in the first visual parameter set to obtain a set of sampled initial visual parameter values; and
obtaining the visual data set of initial visual parameter values using the set of sampled initial visual parameter values.

7. The computer-implemented method according to claim 6, wherein the sampling of the at least one initial visual parameter set is performed using combinatorial testing, or by Latin hypercube sampling.

8. The computer-implemented method according to claim 1, wherein the domain of the first visual parameter specification includes a subset, in a finite-dimensional vector space, of numerical representations that visual parameters are allowed to lie in, or a multi-dimensional interval of continuous or discrete visual parameters, or a set of numerical representations of visual parameters in the finite-dimensional vector space.

9. The computer-implemented method according to claim 1, further comprising:
verifying the second visual parameter specification by:
sampling the second visual parameter specification;
providing a further visual dataset comprising a subset of items of visual data compliant with the second visual parameter specification based on the samples of the second visual parameter specification, and a corresponding subset of items of groundtruth data, and
testing the subset of items of visual data using the computer vision model according to a reduced dimensionality input space to provide a verification result of the second visual parameter specification with reduced complexity.

10. The computer-implemented method according to claim 1, further comprising:
displaying, via a graphical user interface displayed on output interface, a graphical representation of the second visual parameter specification to a user.

11. The computer-implemented method according to claim 10, wherein the displaying includes displaying the graphical representation of the second visual parameter specification in combination with a graphical representation of the first visual parameter specification.

12. The computer-implemented method according to claim 10, wherein the displaying includes displaying the graphical representation of the second visual parameter specification in combination with a graphical representation of the outcome of the sensitivity analysis.

13. The computer-implemented method according to claim 10, further comprising:
  generating a third visual parameter specification as a consequence of an interactive user amendment to the graphical representation of the second visual parameter specification via the graphical user interface.

14. A computer-implemented method for providing a set of training data, comprising:
  obtaining a second visual parameter specification generated by:
    obtaining a computer vision model configured to perform a computer vision function characterising elements of observed scenes,
    obtaining a first visual parameter specification including at least one initial visual parameter set, wherein an item of visual data provided based on an extent of the at least one visual parameter set is capable of affecting a classification or regression performance of the computer vision model,
    providing a visual data set includes a subset of items of visual data compliant with the first visual parameter specification, and a corresponding subset of items of groundtruth data,
    applying the subset of items of visual data to the computer vision model to obtain a plurality of performance scores characterizing performance of the computer vision model when applied to the subset of items of visual data of the visual data set, using the corresponding groundtruth data,
    performing a sensitivity analysis of the plurality of performance scores over a domain of the first visual parameter specification, and
    generating the second visual parameter specification including at least one updated visual parameter set, wherein the at least one initial visual parameter set is modified based on an outcome of the sensitivity analysis to provide the at least one updated visual parameter set; and
  obtaining a training data set, wherein the training data set is obtained by one or a combination of:
    generating, using a synthetic visual data generator, a synthetic training data set including synthetic visual data and groundtruth data synthesized according to the second visual parameter set, and/or
    sampling items of visual data from a database comprising specimen images associated with corresponding items of groundtruth data according to the second visual parameter set, and/or
    specifying experimental requirements according to the second visual parameter set, and performing live experiments to obtain the training data set; and
  outputting the training data set.

15. A computer-implemented method for training a computer vision model, comprising:
  obtaining a further computer vision model configured to perform a computer vision function characterising elements of observed scenes; and
  obtaining a training data set by:
    obtaining a second visual parameter specification generated by:
      obtaining a computer vision model configured to perform a computer vision function characterising elements of observed scenes,
      obtaining a first visual parameter specification including at least one initial visual parameter set, wherein an item of visual data provided based on an extent of the at least one visual parameter set is capable of affecting a classification or regression performance of the computer vision model,
      providing a visual data set includes a subset of items of visual data compliant with the first visual parameter specification, and a corresponding subset of items of groundtruth data,
      applying the subset of items of visual data to the computer vision model to obtain a plurality of performance scores characterizing performance of the computer vision model when applied to the subset of items of visual data of the visual data set, using the corresponding groundtruth data,
      performing a sensitivity analysis of the plurality of performance scores over a domain of the first visual parameter specification, and
      generating the second visual parameter specification including at least one updated visual parameter set, wherein the at least one initial visual parameter set is modified based on an outcome of the sensitivity analysis to provide the at least one updated visual parameter set; and
    obtaining the training data set by one or a combination of:
      generating, using a synthetic visual data generator, a synthetic training data set including synthetic visual data and groundtruth data synthesized according to the second visual parameter set, and/or
      sampling items of visual data from a database comprising specimen images associated with corresponding items of groundtruth data according to the second visual parameter set, and/or
      specifying experimental requirements according to the second visual parameter set, and performing live experiments to obtain the training data set; and
    outputting the training data set;
  training the computer vision model using the training data set.

16. An apparatus for modifying a first visual parameter specification to provide a second visual parameter specification characterising a computer vision model, comprising:
  an input interface;
  a processor;
  a memory; and
  an output interface;
  wherein the input interface is configured to obtain a computer vision model configured to perform a computer vision function characterising elements of observed scenes, and to obtain a first visual parameter specification including at least one initial visual parameter set, wherein generating an item of visual data based on the extent of the at least one visual parameter set is capable of affecting a classification or regression performance of the computer vision model;
  wherein the processor is configured to provide a visual data set compliant with the first visual parameter specification, wherein the visual data set includes a subset of items of visual data, and a corresponding subset of items of groundtruth data, to apply the subset of items of visual data to the computer vision model to obtain a plurality of performance scores characterizing the performance of the computer vision model for a plurality of items of visual data and the corresponding groundtruth data, to perform a sensitivity analysis of the plurality of performance scores over a domain of the first visual parameter specification, and to generate a second visual parameter specification comprising at least one updated visual parameter set, wherein the at least one initial visual parameter set is modified based on the outcome of the sensitivity analysis.

17. A non-transitory computer readable medium on which is stored a computer program for modifying a first visual parameter specification to provide a second visual parameter specification characterising a computer vision model, the computer program, when executed by a processor, causing the processor to perform the following steps:

obtaining a computer vision model configured to perform a computer vision function characterising elements of observed scenes;

obtaining a first visual parameter specification including at least one initial visual parameter set, wherein an item of visual data provided based on an extent of the at least one visual parameter set is capable of affecting a classification or regression performance of the computer vision model;

providing a visual data set includes a subset of items of visual data compliant with the first visual parameter specification, and a corresponding subset of items of groundtruth data;

applying the subset of items of visual data to the computer vision model to obtain a plurality of performance scores characterizing performance of the computer vision model when applied to the subset of items of visual data of the visual data set, using the corresponding groundtruth data;

performing a sensitivity analysis of the plurality of performance scores over a domain of the first visual parameter specification; and generating a second visual parameter specification including at least one updated visual parameter set, wherein the at least one initial visual parameter set is modified based on an outcome of the sensitivity analysis to provide the at least one updated visual parameter set.

* * * * *